(12) United States Patent
Harikae et al.

(10) Patent No.: US 8,376,009 B2
(45) Date of Patent: Feb. 19, 2013

(54) PNEUMATIC RADIAL TIRE

(75) Inventors: Shinya Harikae, Hiratsuka (JP); Makoto Ozaki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 725 days.

(21) Appl. No.: 12/266,242

(22) Filed: Nov. 6, 2008

(65) Prior Publication Data

US 2009/0139625 A1   Jun. 4, 2009

(30) Foreign Application Priority Data

Nov. 30, 2007   (JP) ................................ 2007-311320

(51) Int. Cl.
*B60C 9/18* (2006.01)
*B60C 9/22* (2006.01)

(52) U.S. Cl. ......... 152/526; 152/451; 152/527; 152/531

(58) Field of Classification Search .................... 152/531
See application file for complete search history.

(56) References Cited

U.S. PATENT DOCUMENTS

| | | | |
|---|---|---|---|
| 4,735,249 A | 4/1988 | Kabe et al. | |
| 4,745,955 A * | 5/1988 | Morikawa et al. | 152/527 |
| 4,751,952 A * | 6/1988 | Imai | 152/527 |
| 4,818,601 A | 4/1989 | Itoh et al. | |
| 5,372,172 A | 12/1994 | Iseki | |
| 5,382,621 A | 1/1995 | Laube | |
| 6,601,378 B1 * | 8/2003 | Fritsch et al. | 57/238 |
| 6,619,354 B1 | 9/2003 | Kobayashi et al. | |
| 6,799,618 B2 | 10/2004 | Reuter et al. | |
| 7,032,638 B2 | 4/2006 | Herbelleau et al. | |
| 7,188,654 B2 | 3/2007 | Dehnert et al. | |
| 7,222,481 B2 | 5/2007 | Esnault et al. | |

FOREIGN PATENT DOCUMENTS

| | | | |
|---|---|---|---|
| EP | 0 535 969 A1 | | 4/1993 |
| EP | 571204 | * | 11/1993 |
| EP | 661179 | * | 7/1995 |
| JP | 4-249554 | * | 9/1992 |
| JP | 5-294117 | | 11/1993 |
| JP | 5-338404 | | 12/1993 |
| JP | 6-16005 | | 1/1994 |
| JP | 2003-26857 | * | 1/2003 |
| JP | 2003-96242 | * | 4/2003 |
| JP | A 2004-276840 | | 10/2004 |

(Continued)

OTHER PUBLICATIONS

US office action issued in U.S. Appl. No. 12/267,372, mailed Jul. 14, 2011.

(Continued)

*Primary Examiner* — Justin Fischer
(74) *Attorney, Agent, or Firm* — Greer, Burns & Crain, Ltd.

(57) ABSTRACT

Disclosed is a pneumatic radial tire having improved flat spot resistance without sacrificing its high-speed durability, when a belt auxiliary reinforcement layer thereof is constituted of a hybrid fiber cord including a general-purpose nylon as a low-elastic fiber yarn. In the pneumatic radial tire, the belt auxiliary reinforcement layer is formed by winding an organic fiber cord around the outer periphery of belt layers in the tire circumferential direction. The organic fiber cord constituting the belt auxiliary reinforcement layer is obtained by twisting a highly-elastic fiber yarn with an elastic modulus of 10000 MPa or more and a low-elastic fiber yarn made of nylon 46.

2 Claims, 1 Drawing Sheet

FOREIGN PATENT DOCUMENTS

| | | |
|---|---|---|
| JP | A 2004-308023 | 11/2004 |
| JP | 2004-352174 | 12/2004 |
| JP | A 2005-205933 | 8/2005 |
| KR | 99027189 | 4/1999 |

OTHER PUBLICATIONS

US office action issued in U.S. Appl. No. 12/266,305, mailed Jul. 12, 2011.

US office action issued in U.S. Appl. No. 12/267,372, mailed Dec. 12, 2011.

US office action issued in U.S. Appl. No. 12/266,305, mailed May 15, 2012.

US office action issued in U.S. Appl. No. 12/266,305, mailed Aug. 6, 2012.

US office action issued in U.S. Appl. No. 12/267,372, mailed Apr. 24, 2012.

* cited by examiner

PNEUMATIC RADIAL TIRE

FIELD OF THE INVENTION

The present invention relates to a pneumatic radial tire. Particularly, the present invention relates to a pneumatic radial tire which includes a belt auxiliary reinforcement layer using general-purpose nylon fibers while its flat spot resistance is improved without sacrificing its high-speed durability.

DESCRIPTION OF THE RELATED ART

A conventional method for concurrently securing the high-speed durability and reducing the road noise of the tire has been to arrange a belt auxiliary reinforcement layer in the outer periphery of the belt layer of the tire. The belt auxiliary reinforcement layer is obtained by helically winding a heat-shrinkable organic fiber cord made of nylon or the like around the belt layer in the tire circumferential direction.

Recently, there has been an increasingly strong demand for further reducing the road noise of a tire with a growing demand for more luxurious and quieter automobiles. To meet the demand, a highly-elastic fiber yarn cord is used for the belt auxiliary reinforcement layer (see Japanese Patent Application Kokai Publication No. 2004-308023, for example). However, the low elongation percentage of the highly-elastic fiber yarn cord used for the belt auxiliary reinforcement layer causes the fiber cord to cut into the belt layer in the course of lift process during curing. Accordingly this makes the interlayer gauge between the belt auxiliary reinforcement layer and the belt layer thinner. This leads to a problem of a reduced high-speed durability of the tire.

To solve this problem, a proposal has been made on use of a hybrid fiber cord for the belt auxiliary reinforcement layer (Japanese Patent Application Kokai Publications No. 2004-276840 and No. 2005-205933, for example). Here, the hybrid fiber cord is obtained by twisting together a highly-elastic fiber yarn made of polyketone or the like and a low-elastic fiber yarn made of a general-purpose nylon (such as nylon 66 and nylon 6). Thus obtained hybrid fiber cord has enough elongation percentage while the hybrid fiber cord is prevented from cutting into the belt layer during the curing and the effect of reducing road noise of the tire is maintained.

The use of the general-purpose nylon 66 or nylon 6 for the low-elastic fiber yarn is advantageous in view of the high-speed durability because the general purpose nylon thermally shrinks to a large extent at higher temperature. However, because the glass transition points of nylon 66 and nylon 6 are low, deformation once caused in the general-purpose nylon due to high heat generated during high-speed running is set into the general purpose nylon. This is likely to cause a problem so called flat spot phenomenon, in which the tire irregularly vibrates when the tire resumes running after stopping for a certain length of time.

SUMMARY OF THE INVENTION

An object of the present invention is to solve the problems with the conventional radial tires by providing a pneumatic radial tire with a belt auxiliary reinforcement layer constituted of a hybrid fiber cord including a low-elastic fiber yarn using general-purpose nylon fibers. Here, the radial tire has improved flat spot resistance without sacrificing its high-speed durability.

To achieve the foregoing object, a pneumatic radial tire of the present invention is characterized by including: multiple belt layers arranged in the outer periphery of a carcass layer in a tread part, an extending direction of cords in each of the belt layers intersecting that of cords in another one of the belt layers; and a belt auxiliary reinforcement layer formed by helically winding, in a tire circumferential direction, an organic fiber cord around the entire outer periphery of the belt layers and/or in the two end areas of the belt layers. The pneumatic radial tire is also characterized in that the organic fiber cord is constituted of a hybrid fiber cord obtained by twisting together a highly-elastic fiber yarn with an elastic modulus of 10000 MPa and a low-elastic fiber yarn made of nylon 46.

In addition, it is desirable that the pneumatic radial tire configured in the above-described manner is further configured in such a way as to satisfy the following conditions (1) to (4).

(1) The highly-elastic fiber yarn is made of any one of aramid fibers, polyparaphenylene benzobis oxazole fibers and polyketone fibers.

(2) The hybrid fiber cord is formed with a three-yarn twisted structure in which two highly-elastic fiber yarns and one low-elastic fiber yarn are twisted together.

(3) The number of first twists of the low-elastic fiber yarn is smaller than the number of first twists of the highly-elastic fiber yarn. Concurrently, the ratio L/H of a first twist coefficient L of the low-elastic fiber yarn to a first twist coefficient H of the highly-elastic fiber yarn is 0.60 to 0.90, the coefficient L and the coefficient H being respectively expressed with $$L = T_L \times D_L^{1/2}$$

$$H = T_H \times D_H^{1/2}$$

where $T_L$ denotes the number of first twists (twists/10 cm) of the low-elastic fiber yarn; $D_L$ denotes the fineness (dtex) of the low-elastic fiber yarn; $T_H$ denotes the number of first twists (twists/10 cm) of the highly-elastic fiber yarn; and $D_H$ denotes the fineness (dtex) of the highly-elastic fiber yarn.

(4) A sample taken from a coating rubber of the cord in each of the belt layers after curing has a permanent tensile deformation of not more than 3.0%.

According to the present invention, the belt auxiliary reinforcement layer is constituted of the hybrid fiber cord including the highly-elastic fiber yarn and the low-elastic fiber yarn, and the nylon 46 fibers having high glass transition point is used for the low-elastic fiber yarn. Accordingly, in the present invention, the elongation of the nylon 46 fibers prevents the cord from cutting into the belt layer during curing while the arresting effect of the highly-elastic fiber yarn secures high-speed durability. In addition, since the low-elastic fiber yarn is made of nylon 46 having high glass transition point, the present invention is capable of ameliorating the set characteristics which is a deformation set by high heat generated during high-speed driving, thus improving the flat spot resistance of the pneumatic radial tire.

DETAILED DESCRIPTION OF THE PREFERRED EMBODIMENTS

Detailed descriptions will be provided hereinblow for the configurations of the present invention by referring to the attached drawings.

Figure 1:
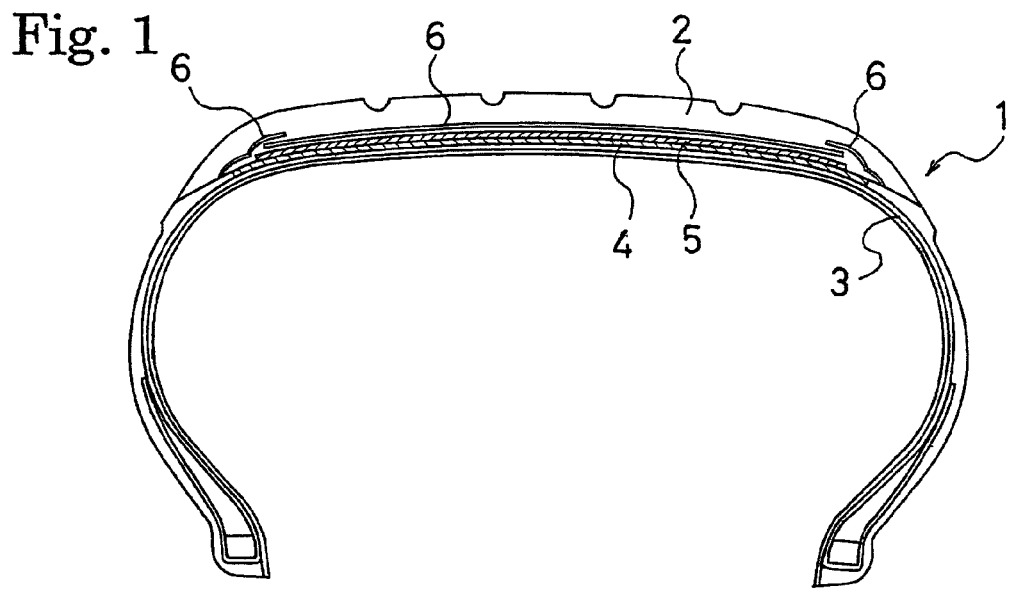
FIG. 1 is a cross-sectional view showing a pneumatic radial tire according to an embodiment of the present invention.
Figure 2:
FIG. 2 is a cross-sectional view showing an example of a hybrid fiber cord constituting a belt auxiliary reinforcement layer according to the embodiment of the present invention.

FIG. 1 is a cross-sectional view showing apneumatic radial tire according to an embodiment of the present invention. FIG. 2 is a cross-sectional view showing an example of a hybrid fiber cord constituting a belt auxiliary reinforcement layer.

As shown in FIG. 1, a pneumatic radial tire 1 includes plural belt layers (two in FIG. 1) 4, 5 which are arranged in the outer periphery of a carcass layer 3 in a tread part 3. The directions in which the cords extend in the belt layer 4 and the belt layer 5 intersect each other. A belt auxiliary reinforcement layer 6 is formed by helically winding an organic fiber cord, in the tire circumferential direction, around the entire outer periphery of the belt layers 4, 5 and at the two end areas of the belt layers 4, 5. As shown in FIG. 2, the organic fiber cord is constituted of a hybrid fiber cord 6z obtained by twisting together a highly-elastic fiber yarn 6P with an elastic modulus of 10000 Mpa or more and a low-elastic fiber yarn 6q made of nylon 46.

Because the belt auxiliary reinforcement layers 6 are each constituted of the hybrid fiber cord 6z obtained by twisting together the highly-elastic fiber yarn 6P with an elastic modulus of 10000 Mpa or more and the low-elastic fiber yarn 6q made of nylon 46, it is possible to prevent the belt auxiliary reinforcement layer 6 from cutting into the belt layers 4, 5 during curing by elongation of nylon 46 fibers constituting the low-elastic fiber yarn 6q, while securing the high-speed durability for the pneumatic radial tire by the arresting effect of the highly-elastic fiber yarn 6p. In addition, because the low-elastic fiber yarn 6q is made of nylon 46 having high glass transition point, the use of nylon 46 prevents deformation from being set into the belt auxiliary reinforcement layer due to high heat generated during high-speed driving. Thus, the flat spot resistance of the pneumatic radial tire is improved.

The elastic modulus of the above-described highly-elastic fiber yarn 6p was obtained through a tensile test applied to a yarn in accordance with JIS (Japanese Industrial Standards) L1017-2002 "Test Methods for Chemical Fiber Tire Cords." Here, the yarn was obtained by untwisting the cord taken from the tire. Specifically, the elastic modulus E was obtained by using an equation expressed with $$E = [105/(e_2 - e_1) \times 100]/S$$

where $e_1$ denotes the elongation percentage (%) of the yarn applied with load of 44N; $e_2$ denotes the elongation percentage (%) of the yarn applied with load of 149N; and S denotes the cross section of the yarn (unit: mm$^2$). S is obtained by using an equation expressed with $$S = D/10000p$$

where D denotes the nominal fineness (dtex) of the yarn; and p denotes the nominal specific gravity of a fiber constituting the yarn.

In the present invention, no specific restriction is imposed on the material for the highly-elastic fiber yarn 6p constituting the belt auxiliary reinforcement layer 6. However, it is desirable to use an aramid fiber, a polyparaphenylene benzobis oxazole fiber (PBO fiber), a polyketone fiber (POK fiber) or like as the material for the highly-elastic fiber yarn 6p.

In the case of the pneumatic radial tire 1 according to the present invention, it is desirable to set the angle between the extending direction of a cord in each of the belt layers 4, 5 and the tire circumferential direction to 24° to 35°. It is more desirable to set the angle to 27° to 33°. The angle thus selected makes it possible to improve both the high-speed durability and the flat spot resistance in a balanced manner.

Figure 3:
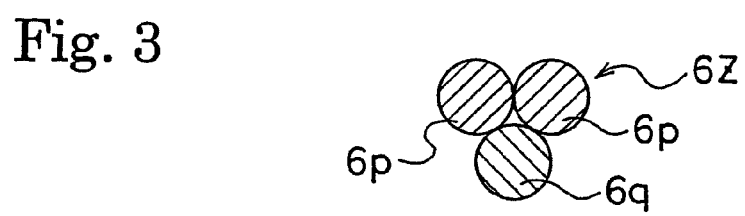
FIG. 3 is a cross-sectional view showing another example of the hybrid fiber cord constituting a belt auxiliary reinforcement layer according to the embodiment of the present invention.

In the present invention, as shown in FIG. 3, it is desirable to form the hybrid fiber cord 6z with a three-yarn twisted structure in which two highly-elastic fiber yarns 6p and one low-elastic fiber yarn 6q are twisted together. The three-yarn twisted structure stabilizes the form of the cord, and thus further improves the flat spot resistance of the tire. In addition, the three-yarn twisted structure improves the fatigue resistance, and thus further enhances the high-speed durability of the tire.

In the present invention, it is more desirable that the number of first twists of the low-elastic fiber yarn 6q is smaller than that of the highly-elastic fiber yarn 6p. In addition, it is desirable that the ratio L/H is controlled so as to be set between 0.60 and 0.90. Here, L denotes the first twist coefficient of the low-elastic fiber yarn 6q, and H denotes the first twist coefficient of the highly-elastic fiber yarn 6p. It is more desirable that the ratio L/H is controlled so as to be set between 0.69 and 0.80. The first twist coefficient L of the low-elastic fiber yarn 6q and the first twist coefficient H of the highly-elastic fiber yarn 6p are expressed with the respective equations $$L = T_L \times D_L^{1/2}$$

$$H = T_H \times D_H^{1/2}$$

where $T_L$ denotes the number of first twists (twits/10 cm) of the low-elastic fiber yarn; $D_L$ denotes the fineness (dtex) of the low-elastic fiber yarn; $T_H$ denotes the number of first twists (twits/10 cm) of the highly-elastic fiber yarn; and $D_H$ denotes the fineness (dtex) of the highly-elastic fiber yarn.

The controlling of the ratio L/H in this manner increases the shrink properties of the hybrid fiber cord 6z, and thus enhances the hoop effects of the respective belt layers 4, 5 during high speed drive, and improves the high-speed durability of the tire.

In the pneumatic radial tire 1 according to the present invention, it is desirable that the permanent tensile deformation of a sample taken from a coating rubber coating the cord of each of the belt layers 4, 5 is controlled so as to be 3.0% or less. It is more desirable to control the permanent tensile deformation so as to be 2.5% or less. The controlling of the permanent tensile deformation in this manner eases the heat setting of the cords in the belt layers 4, 5 at the footprint part of the tire, and thus further improves the flat spot resistance.

As a coating rubber for coating the cords of the belt layers 4, 5, it is desirable to use one or more rubber selected from a group consisted of NR (natural rubber), SBR (stylene-butadiene rubber), BR (butadiene rubber) and IR (isoplene rubber). It is most desirable to use NR as the coating rubber.

Furthermore, the amount of sulfur used for the coating rubber should be 4.0 to 8.0 parts by weight, more preferably 5.0 to 7.5 parts by weight, per 100 parts by weight of rubber.

The above-described permanent tensile deformation is obtained by calculating $$[(L1 - L0)/L0] \times 100\%$$

where L0 denotes the length of a rubber piece sampled out from the tire after curing, and L1 denotes the length of a rubber piece which is obtained by: applying tensile deformation, by 25% of its original length, to the rubber piece with a length L0 sampled out from the post-cured tire; subsequently leaving the rubber piece thus deformed in an atmosphere of 70° C. for 1 hour; thereafter leaving the resultant rubber piece in an atmosphere of 25° C. for 22 hours; after that, releasing the rubber piece from the deformation; and then leaving the thus-released rubber piece in an atmosphere of 25° C. for 1 hour.

In the embodiment shown in FIG. 1, the belt auxiliary reinforcement layers 6 is arranged in the entire outer periphery of the belt layer 5 and in the two end areas thereof. However, the arrangement of the belt auxiliary reinforcement layers 6 is not limited to this case. The belt auxiliary reinforcement layer 6 may be arranged only in the entire outer periphery of the belt layer 5 or only in the each of two end areas of the belt layer 5. Moreover, the belt auxiliary reinforcement layer 6 may be arranged in such a way as to be divided into multiple blocks in the tire width direction.

Figure 4:
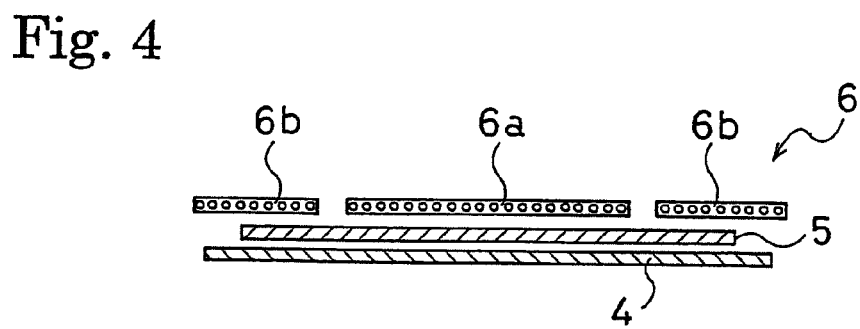
FIG. 4 is a cross-sectional view schematically showing an arrangement relationship between belt layers and a belt auxiliary reinforcement layer in a pneumatic radial tire according to another embodiment of the present invention by spreading out the belt layers and the belt auxiliary reinforcement layer into flat sheets.

FIG. 4 is a cross-sectional view schematically showing an arrangement relationship between the belt layers 4, 5 and the belt auxiliary reinforcement layer 6 in a pneumatic radial tire according to another embodiment of the present invention by spreading out the belt layers 4, 5 and the belt auxiliary reinforcement layer 6 into flat sheets. In this case, the belt auxiliary reinforcement layer 6 is divided into: a block located in the center area of the tire; and two blocks located in the respective two end areas of the tire.

In FIG. 4, a belt auxiliary reinforcement layer 6a arranged in the center area of the tire and belt auxiliary reinforcement layers 6b, 6b arranged in the respective two end areas of the tire, may be constituted of the same type of organic fiber cord or may be of different types between the center area of the tire and the two end areas of the tire. In both cases, the hybrid fiber cord obtained by twisting together the highly-elastic fiber yarn 6P with an elastic modulus of 10000 MPa or more and the low-elastic fiber yarn 6q made of nylon 46 is used for any one of the belt auxiliary reinforcement layers 6a and 6b. In these cases, the belt auxiliary reinforcement layer 6a and the belt auxiliary reinforcement layer 6b, 6b may be arranged with a predetermined interval between each two neighboring belt auxiliary reinforcement layers as shown in FIG. 4, or with no interval between each two neighboring belt auxiliary reinforcement layers.

In the above embodiment shown in FIG. 4, the hybrid fiber cord 6z obtained by twisting together the above mentioned highly-elastic fiber yarn 6p with an elastic modulus of 10000 MPa or more and the low-elastic fiber yarn 6q made of nylon 46 may be used for the belt auxiliary reinforcement layer 6a arranged in the center area. Meanwhile, an organic fiber cord made of fibers such as aramid fibers having higher elastic modulus may be used for the belt auxiliary reinforcement layers 6b, 6b arranged in the respective two end areas. Thus, the effect of reducing road noise of the tire is increased.

Otherwise, the hybrid fiber cord 6z obtained by twisting together the highly-elastic fiber yarn 6p with an elastic modulus of 10000 MPa or more and the low-elastic fiber yarn 6q made of nylon 46 may be used for the belt auxiliary reinforcement layer 6b, 6b arranged in the respective two end areas, whereas an organic fiber cord having lower elastic modulus than the elastic modulus may be used for the belt auxiliary reinforcement layer 6a arranged in the center area.

As described above, the pneumatic radial tire according to the present invention uses the nylon 46 fibers having higher glass transition point instead of the general-purpose nylon fibers which, in the conventional type of tire, is included in the hybrid fiber cord that constitute the belt auxiliary reinforcement layer. Thereby, a high-level high-speed durability is secured while the flat spot resistance of the pneumatic radial tire is improved. For this reason, the pneumatic radial tire according to the present invention is applicable to high-performance automobiles of recent years in a desirable manner.

EXAMPLES

Conventional Example 1 and Example 1

A conventional tire (Conventional Example 1) using a hybrid fiber cord obtained by twisting together an aramid fiber yarn and a nylon 66 fiber yarn for the belt auxiliary reinforcement layer and a tire according to the present invention (Example 1) using a hybrid fiber cord obtained by twisting together an aramid fiber yarn and a nylon 46 fiber yarn for the belt auxiliary reinforcement layer were produced, as shown in Table 1. Both tires have tire sizes of 245/40R18 and tire structures as shown in FIG. 1. In addition, in each tire, the angle between the direction in which the cord extended in the belt layer and the tire circumferential direction was set at 27°, and the total width of the. belt layer was set at 220 mm.

For each of the two types of tires, the flat spot resistance and the high-speed durability were evaluated by using the below-described test methods. Results of the evaluations of Example 1 were indexed in comparison with results of the corresponding evaluations of Conventional Example 1 which were indexed as 100. These results are included in Table 1.

Flat Spot Resistance

Each type of tire was mounted on a rim with a rim size of 18×7.0 JJ, and was inflated to an air pressure of 230 kPa. By using an indoor drum test method (using a drum with a diameter of 1707 mm), the uniformity (RFV) of each type of tire was measured in accordance with JASO (Japan Automobile Standards Organization) C607. In addition, each type of tire was caused to preliminarily run on the drum at a speed of 150 km/h for 30 minutes, and thereafter was stopped. Subsequently, each type of tire was left with a load (6.37 kN) being applied onto the tire for 1 hour. After that, the uniformity (RFV) of each type of tire was measured again. For each type of tire, the difference between the uniformity measured before and after the preliminary run was used as an evaluation index. The result of the evaluation of Example 1 was indexed in comparison with that of Comparative Example 1 which was indexed as 100, and was included in Table 1. A smaller index value means a better flat spot resistance.

High-speed Durability

Each type of tire was mounted on a rim with a rim size of 18×7.0 JJ, and was inflated to an air pressure of 280 kPa. By using an indoor drum test method (using a drum with a diameter of 1707 mm), each type of tire was caused to run, for 1 hour, on the drum at an initial speed of 120 km/h with 88% of the maximum load specified in JATMA (Japan Automobile Tyre Manufacturers Association) being applied onto the tire, and subsequently was caused to run on the drum at the speed which was increased by 10 km/h every 20 minutes until the tire was broken. Thus, the distance which each type of tire ran until the tire was broken was measured. The result of the test of Example 1 was indexed in comparison with that of Conventional Example 1 which was indexed as 100. A larger index value means a better high-speed durability.

TABLE 1

|  |  | CONVENTIONAL EXAMPLE | EXAMPLE 1 |
|---|---|---|---|
| HYBRID FIBER CORD | END COUNT (ENDS PER 50 MM WIDTH) | 50 | 50 |
|  | YARN TWISTED STRUCTURE | TWO-YARN TWISTED | TWO-YARN TWISTED |
|  | NUMBER OF SECOND TWISTS (TWISTS PER 10 CM) | 38 | 38 |
|  | COEFFICIENT K REPRESENTING SECOND TWIST | 2105 | 2105 |
| HIGHLY-ELASTIC FIBER YARN | MATERIAL | ARAMID | ARAMID |
|  | FINENESS (dtex) | 1670 | 1670 |
|  | NUMBER OF TWISTS (TWISTS PER 10 CM) | 38 | 38 |
| LOW-ELASTIC FIBER YARN | MATERIAL | NYLON 66 | NYLON 46 |
|  | FINENESS (dtex) | 1400 | 1400 |
|  | NUMBER OF TWISTS (TWISTS PER 10 CM) | 38 | 38 |
| EVALUATION | FLAT SPOT RESISTANCE | 100 | 90 |
|  | HIGH-SPEED DURABILITY | 100 | 98 |

It is learned from Table 1 that the tire according to the present invention (Example 1) maintained almost equal level of the high-speed durability as the conventional type of tire (Conventional Example 1), while improving the flat spot resistance compared to the conventional type of tire.

Examples 2 to 9

Eight types of tires according to the present invention (Examples 2 to 9) were produced with their hybrid fiber cords used for the respective belt auxiliary reinforcement layers being made different from one another, as shown in Table 2. Here, all types of tires have tire sizes of 245/40R18 and tire structures as shown in FIG. 1. The hybrid fiber cord of each of Examples 3 to 9 was formed with a three-yarn twisted structure in which two highly-elastic fiber yarns and one low-elastic fiber yarn were twisted together. In addition, the highly-elastic fiber yarns respectively of Examples 2 to 9 had the same end count. Furthermore, in each of Examples 2 to 9, the angle between the direction in which the cord extends in the belt layer and the tire circumferential direction was set at 27°, and the total width of the belt layer was set at 220 mm.

For each of these 8 types of tires, the high-speed durability and the flat spot resistance were evaluated by using same test methods as described above. For each of Examples 3 to 9, results of the evaluations were indexed in comparison with results of the evaluations of Example 2 which is indexed as 100.

TABLE 2

|  |  | EXAMPLE 2 | EXAMPLE 3 | EXAMPLE 4 | EXAMPLE 5 |
|---|---|---|---|---|---|
| HYBRID FIBER CORD | END COUNT (ENDS PER 50 MM WIDTH) | 50 | 38 | 38 | 38 |
|  | YARN TWISTED STRUCTURE | TWO-YARN TWISTED | THREE-YARN TWISTED | THREE-YARN TWISTED | THREE-YARN TWISTED |
|  | NUMBER OF SECOND TWISTS (TWISTS PER 10 CM) | 36 | 36 | 36 | 36 |
|  | COEFFICIENT K REPRESENTING SECOND TWIST | 1995 | 2017 | 2017 | 2017 |
| HIGHLY-ELASTIC FIBER YARN | MATERIAL | ARAMID | ARAMID | ARAMID | ARAMID |
|  | FINENESS (dtex) | 1670 | 1100 | 1100 | 1100 |
|  | NUMBER OF TWISTS (TWISTS PER 10 CM) | 36 | 36 | 36 | 36 |
| LOW-ELASTIC FIBER YARN | MATERIAL | NYLON 46 | NYLON 46 | NYLON 46 | NYLON 46 |
|  | FINENESS (dtex) | 1400 | 940 | 940 | 940 |
|  | NUMBER OF TWISTS (TWISTS PER 10 CM) | 36 | 36 | 23 | 27 |
| RATIO L/H BETWEEN FIRST TWIST COEFFICIENTS | | 0.92 | 0.92 | 0.59 | 0.69 |
| EVALUATION | FLAT SPOT RESISTANCE | 100 | 87 | 82 | 84 |
|  | HIGH-SPEED DURABILITY | 100 | 120 | 105 | 130 |

TABLE 2-continued

| | | EXAMPLE 6 | EXAMPLE 7 | EXAMPLE 8 | EXAMPLE 9 |
|---|---|---|---|---|---|
| HYBRID FIBER CORD | END COUNT (ENDS PER 50 MM WIDTH) | 38 | 38 | 38 | 38 |
| | YARN TWISTED STRUCTURE | THREE-YARN TWISTED | THREE-YARN TWISTED | THREE-YARN TWISTED | THREE-YARN TWISTED |
| | NUMBER OF SECOND TWISTS (TWISTS PER 10 CM) | 36 | 36 | 36 | 36 |
| | COEFFICIENT K REPRESENTING SECOND TWIST | 2017 | 2017 | 2017 | 2017 |
| HIGHLY-ELASTIC FIBER YARN | MATERIAL | ARAMID | ARAMID | POK | PBO |
| | FINENESS (dtex) | 1100 | 1100 | 1100 | 1100 |
| | NUMBER OF TWISTS (TWISTS PER 10 CM) | 36 | 36 | 36 | 36 |
| LOW-ELASTIC FIBER YARN | MATERIAL | NYLON 46 | NYLON 46 | NYLON 46 | NYLON 46 |
| | FINENESS (dtex) | 940 | 940 | 940 | 940 |
| | NUMBER OF TWISTS (TWISTS PER 10 CM) | 31 | 40 | 36 | 36 |
| RATIO L/H BETWEEN FIRST TWIST COEFFICIENTS | | 0.80 | 1.03 | 0.92 | 0.92 |
| EVALUATION | FLAT SPOT RESISTANCE | 85 | 89 | 87 | 87 |
| | HIGH-SPEED DURABILITY | 140 | 103 | 120 | 126 |

It is learned from Table 2 that Examples 3 to 9 each using the hybrid fiber cord formed with the three-yarn twisted structure had improved flat spot resistance and high-speed durability than those of Example 2 using the hybrid fiber cord formed with the two-yarn twisted structure. In addition, in Examples 5 and 6 of table 2, the ratio L/H of the first twist coefficient L of the low-elastic fiber yarn to the first twist coefficient H of the highly-elastic fiber yarn (which is shortened to Ratio between First Twist Coefficients L/H in Table 2) was set in a range of 0.60 to 0.90. Example 5 and 6 had improved high-speed durability than that of Example 4 for which the ratio L/H was set smaller than 0.60, and also than that of each of Examples 3 and 7 to 9 for which the ratio l/H was set more than 0.90.

Example 10

The other type of tire (Example 10) according to the present invention was produced with a tire size of 245/40R18, and a tire structure shown in FIG. 1. In the tire, a hybrid fiber cord obtained by twisting together an aramid fiber yarn and a nylon 46 fiber yarn is used for its belt auxiliary reinforcement layer. Also, the tire was produced so that a coating rubber coating a cord of a belt layer after curing has the permanent tensile deformation (%) as shown in Table 3. In addition, the tire according to the present invention (Example 10) used the hybrid fiber cord obtained by twisting together two aramid fiber yarns and one nylon 46 fiber yarn. Furthermore, the angle between the direction in which the cord extends in the belt layer and the tire circumferential direction was set at 27°, and the total width of the belt layer was set at 220 mm.

The high-speed durability and the flat spot resistance of the tire were evaluated by using same test methods as described above. Results of the evaluations of the tire were indexed in comparison with those of Example 3 which is indexed as 100. These results are also included in Table 3.

The permanent tensile deformation (%) of the above-mentioned coating rubber was measured as follows.

Permanent Tensile Deformation

Tensile deformation, by 25% of its original length, was applied to a rubber piece with a length L0 sampled out from the tire after curing. Subsequently, the thus-deformed rubber piece was left in an atmosphere of 70° C. for 1 hour. Thereafter, the resultant rubber piece was left in an atmosphere of 25° C. for 22 hours. After that, the rubber piece was released from the deformation and was left in an atmosphere of 25° C. for 1 hour. Subsequently, the length L1 of the resultant rubber piece was measured. On the result of the foregoing measurements, the permanent tensile deformation S was calculated using a following equation:

$$S=[(L1-L0)/L0]\times 100\%.$$

Note that the reference length L0 of the rubber piece was set at 100 mm.

TABLE 3

| | | EXAMPLE 3 | EXAMPLE 10 |
|---|---|---|---|
| HYBRID FIBER CORD | END COUNT (ENDS PER 50 MM WIDTH) | 38 | 38 |
| | YARN TWISTED STRUCTURE | THREE-YARN TWISTED | THREE-YARN TWISTED |
| | NUMBER OF SECOND TWISTS (TWISTS PER 10 CM) | 36 | 36 |
| | COEFFICIENT K REPRESENTING SECOND TWIST | 2017 | 2017 |
| HIGHLY-ELASTIC FIBER YARN | MATERIAL | ARAMID | ARAMID |
| | FINENESS (dtex) | 1100 | 1100 |
| | NUMBER OF TWISTS (TWISTS PER 10 CM) | 36 | 36 |

TABLE 3-continued

|  |  | EXAMPLE 3 | EXAMPLE 10 |
|---|---|---|---|
| LOW-ELASTIC FIBER YARN | MATERIAL | NYLON 46 | NYLON 46 |
|  | FINENESS (dtex) | 940 | 940 |
|  | NUMBER OF TWISTS (TWISTS PER 10 CM) | 36 | 36 |
| RATIO L/H BETWEEN FIRST TWIST COEFFICIENTS |  | 0.92 | 0.92 |
| PERMANENT TENSILE DEFORMATION OF A COATING RUBBER FOR BELT LAYER (%) |  | 4.2 | 2.3 |
| EVALUATION | FLAT SPOT RESISTANCE | 100 | 90 |
|  | HIGH-SPEED DURABILITY | 100 | 100 |

It is learned from Table 3 that Example 10 including the belt layer whose cord was coated with a coating rubber that has permanent tensile deformation of 3% or less had improved flat spot resistance than Example 3 including the belt layer whose cord was coated with a coating rubber that has permanent tensile deformation of 4.2%.

What is claimed is:

1. A pneumatic radial tire comprising:
a plurality of belt layers arranged in an outer periphery of a carcass layer in a tread part, an extending direction of cords in each of the belt layers intersecting that of cords in another one of the belt layers; and
a belt auxiliary reinforcement layer arranged around the entire outer periphery of the belt layer, and divided into a center belt auxiliary reinforcement layer arranged in the center area of the tire and outer belt auxiliary reinforcement layers arranged in the respective two end areas of the tire, the center belt auxiliary reinforcement layer being formed by helically winding, in a tire circumferential direction, a first organic fiber cord around the outer periphery of the center area of the belt layers, the outer belt auxiliary reinforcement layers being formed by helically winding, in a tire circumferential direction, a second organic fiber cord around the outer periphery of the two end areas of the belt layers,
wherein the first organic fiber cord is constituted of a hybrid fiber cord obtained by twisting together a highly-elastic fiber yarn with an elastic modulus of not less than 10000 MPa and a low-elastic fiber yarn made of nylon 46, and the second organic fiber cord differs from said hybrid fiber cord,
wherein the outer belt auxiliary reinforcement layers are formed as a single layer, and
the number of first twists of the low-elastic fiber yarn is smaller than the number of the first twists of the highly-elastic fiber yarn, and
a ratio L/H of a first twist coefficient L of the low-elastic fiber yarn to a first twist coefficient H of the highly-elastic fiber yarn is 0.69 to 0.80, the coefficient L and the coefficient H being respectively expressed with $$L = T_L \times D_L^{1/2}$$

$$H = T_H \times D_H^{1/2}$$

where $T_L$ denotes the number of first twists (twists/10 cm) of the low-elastic fiber yarn; $D_L$ denotes the fineness (dtex) of the low-elastic fiber yarn; $T_H$ denotes the number of first twists (twists/10 cm) of the highly-elastic fiber yarn; and $D_H$ denotes the fineness (dtex) of the highly-elastic fiber yarn, and
wherein the hybrid fiber cord is formed with a three-yarn twisted structure in which two aforementioned highly-elastic fiber yarns and one aforementioned low-elastic fiber yarn are twisted together.

2. The pneumatic radial tire according to claim 1, wherein the highly-elastic fiber-yarn is made of any one of aramid fibers, polyparaphenylene benzobis oxazole fibers and polyketone fibers.

* * * * *